United States Patent [19]

Burrows

[11] Patent Number: 4,775,465

[45] Date of Patent: Oct. 4, 1988

[54] REVERSE OSMOSIS ASSEMBLY OPERATING VALVE

[76] Inventor: Bruce D. Burrows, 25145 W. Avenue Stanford, Valencia, Calif. 91355

[21] Appl. No.: 13,486

[22] Filed: Feb. 11, 1987

Related U.S. Application Data

[63] Continuation-in-part of Ser. No. 685,546, Dec. 24, 1984, Pat. No. 4,657,674.

[51] Int. Cl.$^4$ .............................................. B01D 13/00
[52] U.S. Cl. .................. 210/110; 210/257.2; 210/433.1
[58] Field of Search .................. 210/110, 257.2, 433.2; 251/31, 211

[56] References Cited

U.S. PATENT DOCUMENTS

| | | | |
|---|---|---|---|
| 3,887,463 | 6/1975 | Bray | 210/110 |
| 4,021,343 | 5/1977 | Tyler | 210/257.2 X |
| 4,269,028 | 5/1981 | Hattori | 251/31 X |
| 4,319,607 | 3/1982 | Fields | 137/625.5 |
| 4,493,270 | 1/1985 | Gamroth | 110/300 X |
| 4,657,674 | 4/1987 | Burrows | 210/110 |

Primary Examiner—Gerald A. Michalsky
Attorney, Agent, or Firm—Nilsson, Robbins, Dalgarn, Berliner, Carson & Wurst

[57] ABSTRACT

A single valve and associated conduits for so operating a reverse osmosis assembly that includes a reverse osmosis cartridge, a reservoir that has a movable barrier therein that sub-divides the interior into first and second confined spaces of variable volume, and a manually operated purified water dispensing valve, so that as the first confined space approaches a filled condition with purified water, the single valve throttles the flow of pressurized feed water to the cartridge to minimize the use of feed water in the operation thereof and when the second confined space approaches a filled condition with reject water the single valve stops the flow of pressurized feed water to protect the reservoir from damage due to high pressure that may be present in the feed water source.

4 Claims, 1 Drawing Sheet

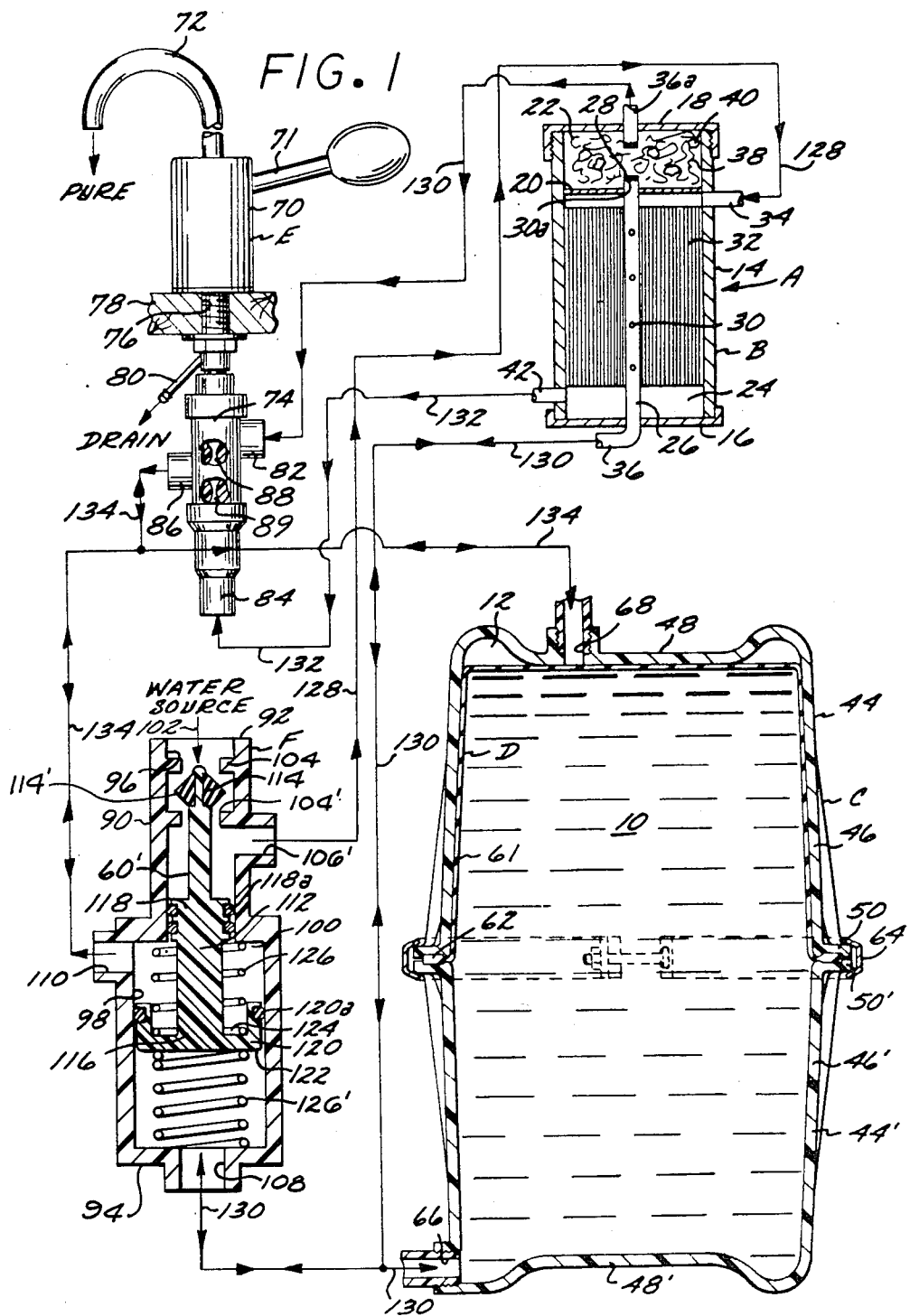

REVERSE OSMOSIS ASSEMBLY OPERATING VALVE

CROSS REFERENCE TO RELATED APPLICATIONS

The present application is a continuation-in-part of application Ser. No. 685,546, filed Dec. 24, 1984 now U.S. Pat. No. 4,657,674.

BACKGROUND OF THE INVENTION

In prior art reverse osmosis assemblies of the type that are located under the sink in a kitchen, the purified water discharges from the reverse osmosis cartridge at a substantial back pressure that prevents the assembly operating at optimum efficiency. In addition thereto the rate of flow of feed water to the reverse osmosis cartridge continues at a uniform rate even when the purified water storage facility is approaching the maximum volume for which it is designed.

A major object of the present invention is to provide a single valve that throttles and reduces the rate of flow of pressurized feed water to the reverse osmosis cartridge when the reservoir for purified water has reached substantially the maximum volume for which it is designed, and as a result a reverse osmosis assembly including the present invention may be operated over a prolonged period of time, with substantially less use of pressurized feed water than with prior art devices of this nature, and with a resultant monetary saving to the user and also stops the flow of pressurized feed water when the reservoir for purified water is substantially empty to prevent subjecting the reservoir to high feed water pressures that may damage the reservoir.

This and other objects and advantages of the invention will become apparent from the following description of a preferred form thereof.

SUMMARY OF THE INVENTION

The valve of the present invention is used in combination with a source of pressurized feed water, and a reverse osmosis assembly. The reverse osmosis assembly includes a reverse osmosis containing cartridge having a feed water inlet, a reject water outlet, and a purified water outlet, the assembly further comprises a reservoir container that includes a movable barrier that sub-divides the interior thereof into first and second confined spaces of variable volume that are in communication with first and second passages in the reservoir container.

The assembly also includes a purified water dispensing valve that has a purified water inlet and a purified water dispensing outlet, a reject water drain outlet, and a reject water passage and inlet, dual flow restrictors, and a two position valve actuator which is illustrated as being a handle that is manually operated although an electrical, hydraulic, or mechanical actuator may be used if desired. The actuator when in a first position obstructs communication between the purified water inlet and purified water dispensing outlet and allows reject water that enters the purified water dispensing valve through the reject water inlet to flow through the first and second flow restrictors prior to discharging from the reject water drain outlet. Reject water in the second confined space as the latter contracts in volume due to discharge of purified water into the first confined space flows into the reject water passage and through the second flow restrictor to the drain outlet.

The two position actuator, when in a second position, allows purified water to flow from the purified water inlet to the purified water dispensing outlet and reject water entering the reject water inlet to substantially bypass the first flow restrictor an flow out of the reject water passage to the second confined space to increase the volume thereof and force purified water from the first confined space. When the actuator is returned to the first position the dispensing of purified water is terminated, with purified water now flowing to the first confined space, and reject water in the second confined space being displaced therefrom to flow through the reject water passage and second flow restrictor to the drain outlet. The valve of the present invention, after the first confined space has been substantially filled with purified water, throttles and reduces the rate of flow of feed water to the reverse osmosis cartridge to minimize the quantity of feed water required to provide the reservoir with a stored quantity of purified water that may be intermittently withdrawn therefrom by use of the purified water dispensing valve. In addition, when the second confined space is substantially filled with reject water and the first confined space is substantially empty the valve of the present invention also stops the flow of feed water to prevent application of feed water pressure to the reservoir therebY to preclude application of possibly damaging pressures thereto.

The valve of the present invention includes an elongate vertically positioned valve body that has an upper end and a bottom, an elongate passage extends downwardly from the upper end to develop into an axially aligned elongate chamber of sustantially greater transverse area than that of said elongate passage, with the chamber partially defined by the bottom and a body shoulder at the junction of the elongate passage and chamber.

The elongate passage is in communication with the source of pressurized feed water. First and second ring shaped valve seats are situated in the elongate passage. A feed water outlet in the valve body is in communication with the elongate passage below the valve seats. A purified water passage is defined in the bottom, and a reject water passage is also defined in the valve body that communicates with the chamber upwardly a substantial distance from the bottom.

An elongate valve member is movably disposed in the valve body with the valve member including upper and lower end surfaces, and the upper end surface including a poppet member capable of sealing with one of the valve seats when the valve member is in a first position and with the other of the valve seats when in a second position. The valve member includes a first piston intermediate the upper and lower ends thereof, which first piston slidably and sealingly engages the elongate passage. A second piston is on the lower end surface of the valve member, with the second piston slidably and sealingly engaging the walls of the chamber to divide chamber into upper and lower chamber portions. The second piston has a lower end surface and a ring shaped upper end surface of lesser transverse area than the lower end surface. A pressurized feed water source is connected to the upper end of the elongate passage and exerts a first downward force on the valve member that tends to move the valve member downwardly from a first to a neutral position where the pressurized feed water is free to flow through the feed water outlet in the valve body. A first spring is disposed in the upper chamber portion of the valve body between the upper end surface of the second piston and the body shoulder. A second spring is disposed in the lower chamber portion between the lower surface of the second piston and the bottom of the valve body. The spring rates of the first and second springs are such that the valve member is positioned so that the poppet is retained in a neutral position between the valve seats during the time when the first confined space is either being filled with purified water or purified water is being withdrawn therefrom. When the first confined space is empty or filled with purified water the resulting pressure changes in the reservoir are sensed across the second piston. Responsive to the differential pressure across the piston, the valve and with it the poppet, moves toward the first or second seat to throttle or shut off feed water flow respectively.

A number of conduits are employed in operating the valve of the present invention in association with the reverse osmosis assembly. The conduits include a first conduit that connects the feed water outlet in the valve body to the feed water inlet in the reverse osmosis cartridge. A second conduit extends between the purified water outlet of the reverse osmosis cartridge and communicates with the first passage in the purified water reservoir container, the purified water passage in the valve body, and purified water inlet in the purified water dispensing valve body.

A third conduit extends between the reject water outlet of the reverse osmosis cartridge and the reject water inlet of the purified water dispensing valve. A fourth conduit is in communication with the second passage of the reservoir container, the reject water passage in the purified water dispensing valve, and the reject water passage in the valve body of the present invention.

When the actuator is moved to a second position, communication is established between the first confined space containing the purified water, and the purified water dispensing outlet. Substantially all pressurized feed water now flowing into the reverse osmosis cartridge fast flows across the membrane therein to remove foreign material therefrom and then enters the second confined space to expand it, and the reject water in the second confined space exerting a first pressure through the barrier on the purified water in the first confined space that causes the purified water to flow therefrom and discharge through the purified water dispensing outlet. The reject water not only exerts a first pressure on the barrier, but also exerts a downward force on the upper surface of the second piston. The bottom surface of the second piston rests on the second spring which, along with the pressure of the purified water, keeps the valve member in the neutral position. When all of the purified water is withdrawn from the first confined space the pressure therein falls to zero. At this time the force exerted on the top surface of the second piston by the fast flow of the feed water across the membrane will cause the valve to move downwardly against the force of the second spring to cause the poppet to seal against the second ring shaped valve and shut off the flow of feed water.

When the actuator is returned to the first position, communication between the purified water in the first confined space and the purified water dispensing outlet is obstructed. The valve member of the present invention returns to and remains in the neutral position to allow pressurized feed water to flow to the reverse osmosis cartridge and purified water flowing from the reverse osmosis cartridge to the first confined space to expand the latter. Reject water from the reverse osmosis cartridge flows through the third conduit to the reject water inlet in the purified water dispensing valve and then through the first and second flow restrictors to the reject water drain outlet, and concurrently reject water in the second confined space is forced therefrom as the first confined space expands. Reject water in the second confined space flows through the fourth conduit to the reject water passage in the purified water dispensing valve and then through the second flow restrictor to the reject water drain outlet. The flow of purified water and reject water so continues until the first confined space approaches a maximum volume, and the pressure on purified water therein increasing to the extent that it exerts an upward force on the lower surface of the second piston which is greate than the combined force exerted by the first spring and the force exerted by the pressurized feed water on the upper end of the first piston and upper end of the valve member. Due to this increased force on the lower surface of the second piston the valve member moves upwardly towards the first position to cause the poppet to engage the first ring valve seat and in so doing throttles and reduces the rate of flow of pressurized feed water to the reverse osmosis cartridge, resulting in a consequent saving of feed water being achieved.

BRIEF DESCRIPTION OF THE DRAWINGS

The single figure in the drawing is a diagrammatic view of the reverse osmosis assembly, with the valve of the present invention illustrated as being associated therewith to throttle the flow of feed water as the purified water reservoir becomes substantially filled with purified water or substantially empty.

DESCRIPTION OF THE PREFERRED EMBODIMENT

The reverse osmosis assembly A as shown in the drawing includes a reverse osmosis cartridge B and a reservoir container C that has a movable barrier D therein. The barrier sub-divides the interior of the reservoir container into first and second confined spaces 10 and 12 of variable volumes. The assembly includes a purified water dispensing valve E that also controls the flow of reject water, and this valve being shown in detailed in my co-pending patent application Ser. No. 848 360 filed in the Patent Office on Apr. 4, 1986, now abandoned and entitled "Combined Purified Water Dispensing Device and Reject Water Control Device". A single valve F is shown in the drawing and is the subject matter of the present invention. This valve throttles the flow of feed water to the reverse osmosis cartridge B when the purified water has discharged into the first confined space 10 to the extent that the latter is of substantially maximum volume and also shuts off the water source when the confined space 10 is empty.

The reverse osmosis cartridge B is illustrated in FIG. 1 as including a cylindrical sidewall 14 that has a first end piece 16 and a second end piece 18 removably mounted thereon. A transverse partition 20 is situated within the cylindrical sidewall 14 and sub-divides the interior of the cartridge into first and second compartments 22 and 24. A rigid tube 26 is longitudinallY disposed within the cartridge B and extends through the partition 20 to terminate in an upper closed end 28. A series of openings 30 are formed in the portion of the tube in the second compartment 24 and similar openings 30a are formed in the portion of the tube situated in the first compartment 22. A reverse osmosis membrane 32 is disposed in the second compartment 24 and envelopes the portion of the tube 26 therein that has the openings 30 therein.

The cartridge B has a first purified water outlet 36 and a second purified water outlet 36a. The first compartment 22 contains activated carbon 38 and may also contain pellets or particles of a soluble mineral compound 40 such as dolomite or the like, which dissolves in the purified water prior to the same being dispensed from the reverse osmosis assembly A. For health purposes, it may be desirable to add magnesium and calcium to the purified water by contact with dolomite 40 or by other means. The reverse osmosis cartridge B includes a reject water outlet 42 in communication with the second compartment 24.

The reservoir container C illustrated as being formed from two cup shaped members 44 and 44' that have conical sidewalls 46 and 46' that merge into end pieces 48 and 48'. The free ends of the sidewalls 46 and 46' develop into outwardly extending ring shaped flanges 50 and 50' as shown in the drawing.

The movable barrier D is illustrated in the drawing as being in the form of a cup 61 that is formed formed from a pliable water impervious material such as rubber that is non-toxic when in contact with the purified water, and the cup 61 on the free ends developing into an outwardly extending ring shaped flange 62.

The flange 62 as shown in the drawing is disposed between the flanges 50 and 50=. The flanges 50 and 50' are engaged by a circumferentially tensionable band 64 that when tightened draws the flanges 50 and 50' together and exerts a sealing force on the flange 62. The cup shaped member 44 has a reject water passage 68 therein, and the cup shaped member 44' has a purified water passage 66 therein that communicates with the first confined space 10.

The purified water dispensing valve E through which reject water may also flow includes a body 70 that has a purified water dispensing spout 72 extending upwardly therefrom and an extension 74 of the body 70 extending downwardly through an opening 76 defined in a drain board 78 that normally will be disposed adjacent a sink (not shown). The extension 74 has a reject water drain 80 extending downwardly and outwardly therefrom and also having a purified water inlet 82 and a reject water inlet 84, as well as a reject water passage 86. First and second flow restrictors 89 and 88 are disposed within the extension 74. Valve E includes a two position actuator 71 that may occupy either first or second positions. When the actuator 71 is in a first position flow of purified water from inlet 82 to spout 72 is obstructed, and reject water flowing into inlet 84 must flow through both first and second flow restrictors 89 and 88 prior to discharging to the drain 80 as described in detail in my co-pending patent application Ser. No. 848,360, now abandoned. When the actuator 71 is in the second position purified water may flow from the inlet 82 to the spout 72, and reject water entering the inlet 84 substantially bypassing the first flow restrictor 89 to flow from passage 86 for reasons that will later be described. Also, for reasons that will later be described reject water flowing into passage 86 must flow through second flow restrictor 88 prior to discharging from drain 80. In summary, all reject water entering inlet 84 must flow through at least second flow restrictor 88 prior to discharging to drain 80.

The single valve F includes an elongate valve body 90 that has an upper end 92 and bottom 94. An elongate passage 96 extends downwardly from the upper end 92 to develop into a chamber 98 that is of substantially greater transverse cross section. The passage 96 and chamber 98 at their junction define a body shoulder 100. The upper end of passage 96 is in communication with a source 102 of pressurized feed water.

First and second spaced apart ring shaped valve seats 104 and 104' project inwardly into the passage 96 and are disposed intermediate the upper end 92 and a feed water outlet 106' that is in communication with the passage 96. A purified water passage 108 is formed in the bottom 94 and communicates with the chamber 98. A reject water passage 110 is formed in the valve body 90 and communicates with the upper portion of the chamber 98.

The single valve F includes an elongate valve member 112 that has an upper end defining a dual faced poppet valve 114 and a lower end 116. The valve member 112 intermediate the poppet 114 and the lower end 116 has a first piston 118 that extends outwardly therefrom and supports a number of sealing rings 118a that are in slidable sealing contact with the portion of the valve body defining the passage 96. A second piston 120 that supports sealing rings 120a is mounted on the lower end 116 of the valve member 112 and is longitudinally and sealingly movable in the chamber 98 and divides chamber 98 into an upper and lower chamber portion.

The upper chamber portion receives reject water pressure from confined space 12 while the lower chamber portion receives purified water pressure from the confined space 10. The second piston 120 has a lower end surface 122 defining the lower chamber portion and an upper ring shaped surface 124 defining the upper chamber portion that is of less transverse cross secion than the lower end surface 122.

A first conduit 128 extends between the pressurized feed water outlet 106 and the feed water inlet 84 in the reverse osmosis cartridge B. The first purified water outlet 36 of reverse osmosis cartridge B is in communication with a second conduit 130 that communicates with the purified water passage 108 and the purified water passage 66 in the reservoir container C, which passage 66 is in communication with the first confined space 10.

The second purified water outlet 36a is connected by another portion of the second conduit 130 to the purified water inlet 82 in the purified water dispensing valve E as shown in the drawing. A third conduit 132 is in communication with the reject water outlet 42 and the reject water inlet 84, in the valve E. A fourth conduit 134 is in communication with the reject water passage 68 in the reservoir container C, which passage 68 is in communication with the second confined space 12. The fourth conduit 134 is also in communication with the reject water passage 86 in the valve E and the reject water passage 110 in the single valve F.

Discharge of purified water from the dispensing spout 72 in the first valve E is controlled by the actuator 71. With the actuator 71 in a first position obstructing communication between the second conduit 130 and the dispensing spout 72, purified water discharging from the reverse osmosis cartridge B will flow through the second conduit 130 to the purified water passage 66 to enter the first confined space 10 as well as the purified water passage 108 that communicates with the chamber 98 below the second piston 120.

When the actuator 71 is in the first position, reject water from the reverse osmosis cartridge B flows through the third conduit 132 to the reject water inlet 84 in the purified water dispensing valve E to flow upwardly through the valve and the first and second flow restrictor 89 and 88 to discharge through the drain outlet 80.

When the actuator 71 is moved to a second position, communication is established between the purified water inlet 82 and the purified water dispensing spout 72. Purified water may now flow from the first confined space 10 through the second conduit 130 to tube 26 and opening 30a into the first compartment 22 to be subjected to the activated carbon 38 therein which removes dissolved gases from the purified water. The purified water discharges through the second outlet 36a into the portion of the second conduit 130 that extends to the purified water inlet 82 in the purified water dispensing valve E. Purified water entering the inlet 82 in valve E can flow through the valve to discharge from the purified water dispensing spout 72 only when the actuator 71 is in the second position. The purified water supplied to spout 72 will contain dissolved minerals due to contact with the dolomite particles 40. The particles 40 if desired may be performed tablets that are formulated to contain desired minerals that are considered advantageous to the health of the users of purified water from the invention.

When the actuator 71 is in the second position reject water discharges through the third conduit 132 to enter the reject water inlet 84 of the valve E to substantially by-pass the first flow restrictor 89 and flow through the reject water passage 86 into the fourth conduit 134. Due to the reject water by-passing the first flow restrictor 89 the rate of flow of reject water into the fourth conduit 134 is at a rapid rate as it is subjected to substantially no back pressure, that is, it is at substantially feed water pressure. Substantially all the feed water flowing into the reverse osmosis cartridge B discharges therefrom as reject water into the third conduit 132 during this phase of the operation of the invention.

The pressure feed water from the source 102 as may be seen in the drawing at all times exerts a downward force on the poppet 114 and piston 118 of valve member 112 that tends to cause the valve member 112 to move downwardly away from first valve seat 104 to a neutral position where poppet 114 is below valve seat 104 but above valve seat 104'.

As reject water at a rapid rate flows into the second confined space 12 through the fourth conduit 134 as well as to the chamber 98 through another portion of the conduit 134, the pressure on reject water in the second confined space 12 increases and exerts a downward force through the barrier D onto the purified water in the first confined space 10, with purified water being forced therefrom to flow through the second conduit to the valve E to discharge from the dispensing spout 72.

The area of the lower surface 122 of second piston 120 that is exposed to purified water is substantially greater than the area of the upper ring shaped surface 124 of the second piston that is in contact with reject water in chamber 98.

The pressure of the purified water in the first confined space 10 exerts an upwardly directed force on the lower surface 122 of the second piston 120. However, this force is less than the forces exerted by the pressurized reject water on the upper ring shaped surface 124 of the second piston 120 and the pressurized feed water on the poppet 114 and the upper surface of first piston 118. The valve member 112 during the dispensing of purified water will remain in the neutral position between the ring valve seats 104 and 104'.

When the actuator 71 is returned to the first position flow of purified water from the purified water inlet 82 of the valve E to the dispensing spout 72 is obstructed. Purified water from the reverse osmosis cartridge B now flows through the second conduit 130 to the first confined space 10. As purified water continues to discharge through the second conduit 130 into the first confined space 10, the first confined space 10 expands and exerts an upward force on reject water in the second confined space 12, with the reject water being forced from the second confined space 12 through the fourth conduit 134 to the reject water passage 86 in the purified water dispensing valve E, with the reject water subsequently flowing upwardly through the second restrictor 88 to discharge through the reject drain outlet 80. Again, during this filling operation, the pressures across the pistons 118 and 120 along with forces generated by the springs 126 and 126' are such that the poppet 114 will remain in the neutral position as shown in the drawings.

After purified water has discharged from the reverse osmosis cartridge B through the second conduit 130 to the first confined space 10 to the extent that the confined space is approaching maximum volume, the pressure in the second confined space 12 and the upper chamber portion is substantially zero and the purified water in the first confined space exerts a pressure through the second conduit 130 on the lower end surface 122 of the piston 120. The resulting force is sufficient to overcome the first downward force exerted by the first spring 126, the pressurized water on the poppet 114 and the upper surface of the first piston 118. The valve member 112 then moves upwardly and the poppet 114 approaches the first valve seat 104 and throttles the flow of feed water to the reverse osmosis cartridge B after the first confined space 10 is substanrially filled with purified water. Such throttling results in a substantial saving of the quantity of pressurized feed water required to operate the reverse osmosis assembly A over a period of time and a substantial saving in money being effected to the user of the assembly.

When the confined space 10 becomes substantially empty of the purified water and the confined space 12 substantially filled with reject water it will be apparent to those skilled in the art that the movable barrier D will reverse the position shown in the drawing and will lie along the bottom 48' of the lower cup shaped member 44'. Under these circumstances the pressure generated in the conduit 130 and the passageway 108 acting on the lower surface 122 of the piston 120 becomes substantially zero. Under these circumstances the pressure of the feed water source at 102 and as applied through the passageways 68 and 110 would, without more, cause the valve 112 to remain open allowing feed water pressure to be applied to the confined space 12 and thus to the container C. Such continual application of the feed water pressure, if the line pressure is high, would tend to cause damage to the container C by rupturing the seal provided by the band 64 and the flange 62 clamped between the flanges 50 and 50' of the cup shaped members 44 and 44'.

To preclude such an event from occurring the poppet 114 includes a lower surface 114' which will engage the lower ring valve seat 104' and block the flow of feed water from the source 102 thereof when the pressure in the confined space 10 becomes substantially zero and the confined space 12 is substantially filled with reject water. To permit the operation of the valve to throttle the feed water source as above described and at the same time to provide the ability to shut off the feed water source when the pressure at the passageway 108 is zero, an additional spring 126' is provided in the lower chamber portion of the chamber 98 and abuts the lower surface 122 of the piston 120.

When the pressure below and above the piston 120 is close to zero the poppet 114 is in the neutral position as shown in the drawing and the lower surface 122 of the piston 120 rests on the top of the spring 126'.

It will thus be seen that the construction of the single valve F as illustrated and described hereinabove permits the appropriate throttling of the feed water source during the time the confined space 10 is filled with the purified water and, at the same time, precludes the application of full feed water source pressure to the container C when the confined space 10 is substantially empty, thereby precluding damage to the container C.

When the pressure at passageway 108 becomes substantially zero because the confined space 10 is substantially empty the force acting on the end 122 of the piston 120 from the purified water reduces to substantially zero. The force acting on the surface 124 of the piston 120 which is produced by the pressure of the feed water (as passed through the third and fourth reject water conduits) is added to the force of the feed water acting on poppet 114 and piston 118 and moves the valve 112 downwardly against the force of the spring 126' until the lower surface 114' of the poppet 114 seals against the second ring seat 104' to shut off the flow of feed water. In this manner feed water source pressure is removed from the reservoir when the confined space 10 is substantially empty. When the actuator 71 is again moved to the first position blocking flow of purified water, the valve 112 will again move to the neutral position as shown in the drawing allowing purified water to enter the confined space 10 as above described.

What is claimed is:

1. In combination with a water reservoir having first and second confined spaces separated by a flexible movable barrier for storing purified water from a reverse osmosis cartridge in the first space and reject water from said cartridge in the second space a single control valve to substantially throttle pressurized feed water from a source thereof when said first space is substantially full of purified water and to shut off feed water flow when said first space is substantially empty, said control valve comprising:

1. a valve body having an elongate passage therethrough defining first and second spaced apart valve seats at one end of said passage and an enlarged volume area at the other end thereof;
2. a valve member slidably disposed within said valve body passage and including;
   (a) poppet means disposed between said valve seats;
   (b) second piston means sealingly disposed within said passage for forming first and second chambers in said enlarged volume area, and;
   (c) first piston means intermediate said second piston means and said poppet means sealing disposed within said passage for isolating said enlarged volume area thereof from said valve seats;
3. means connecting said feed water source to said one end of said passage;
4. feed water outlet means in said valve body between valve seats and said first piston;
5. means connecting said feed water outlet means to said cartridge for allowing feed water flow from said source through said passage and across said valve seats and poppet means when said poppet means is positioned between said valve seats;
6. means interconnecting said first space and said first chamber and said second space and said second chamber respectively for applying the pressures in said first and second spaces to said first and second chambers respectively and across said second piston means, said valve member moving to a first position with said poppet means approaching engagement with said first valve seat when said first space is substantially filled with purified water and to a second position with said poppet means in sealing engagement with said second valve seat when said first space is substantially empty and the pressure in said second chamber approaches feed water pressure.

2. A control valve as defined in claim 1 which further includes first and second spring means disposed in said first and second chambers and engaging said second piston means for holding said poppet means between said valve seats except when said first space is substantially full or substantially empty.

3. A control valve as defined in claim 2 wherein said valve member has first and second ends and said poppet means is a dual surfaced resilient member affixed to said first end of said valve member and said second piston means includes a piston formed at said second end of said valve member.

4. The control valve as defined in claim 3 wherein said valve seats include spaced apart protrusions within said valve body defining continuous ring valve seats.

* * * * *

UNITED STATES PATENT AND TRADEMARK OFFICE
CERTIFICATE OF CORRECTION

PATENT NO.  : 4,775,465
DATED       : OCTOBER 4, 1988
INVENTOR(S) : BRUCE D. BURROWS

It is certified that error appears in the above-identified patent and that said Letters Patent is hereby corrected as shown below:

Col. 2, line 7, delete "an" and insert --and--.
Col. 2, line 28, delete "therebY" and insert --thereby--.
Col. 4, line 19, delete "greate" and insert --greater--.
Col. 4, line 65, after "cartridge", insert --B--.
Col. 4, line 66, delete "longitudinallY" and insert --longitudinally--.
Col. 5, line 3, delete "30a" and insert --30a--.
Col. 5, line 27, delete "formed" second occurrence.
Col. 5, line 33, delete "50===" and insert --50'--.
Col. 6, line 17, delete "110" and insert --110--.
Col. 6, line 41, delete "106" and insert --106'--.

Col. 8, line 12, delete "l30" and replace with --130--.
Col. 8, line 36, delete "l22" and replace with --122--.
     (replace lower case letter 1 and insert numeral 1)
Col. 8, line 43, delete "substanrially" and insert --substantially--.
Col. 9, line 29, delete "lO" and insert --10--.

Signed and Sealed this

Nineteenth Day of December, 1989

*Attest:*

JEFFREY M. SAMUELS

*Attesting Officer*   *Acting Commissioner of Patents and Trademarks*